United States Patent [19]

Viero et al.

[11] 4,123,089
[45] Oct. 31, 1978

[54] GAS SERVICE UNIT

[75] Inventors: Laurence Viero; John Cannon; George Rademaker; Williard Swanson; Kenneth Fessett, all of Chicago, Ill.

[73] Assignee: Oxequip Health Industries Inc., Chicago, Ill.

[21] Appl. No.: 773,035

[22] Filed: Feb. 28, 1977

[51] Int. Cl.² ............................................. F16L 21/00
[52] U.S. Cl. .................................... 285/39; 137/329.1; 285/307; 285/DIG. 15; 285/DIG. 22
[58] Field of Search ............... 285/305, 316, DIG. 22, 285/39, 307, DIG. 15; 137/329.1

[56] References Cited

U.S. PATENT DOCUMENTS

| 2,092,116 | 9/1937 | Hansen | 285/316 X |
|---|---|---|---|
| 2,297,548 | 9/1942 | Fox et al. | 285/316 X |
| 2,344,740 | 3/1941 | Shaff | 285/316 X |
| 2,479,960 | 8/1949 | Osborn | 285/39 X |
| 2,771,308 | 11/1956 | Vitcha et al. | 137/329.1 X |
| 3,149,362 | 9/1964 | Smithson | 285/305 X |
| 3,314,696 | 4/1967 | Ferguson et al. | 285/DIG. 22 X |
| 3,931,829 | 1/1976 | McWhinnie, Jr. et al. | 137/329.1 |

FOREIGN PATENT DOCUMENTS 1,115,540  10/1961  Fed. Rep. of Germany ........... 285/305

*Primary Examiner*—Thomas F. Callaghan
*Attorney, Agent, or Firm*—Fred Philpitt

[57] ABSTRACT

Our invention pertains to a gas outlet device that is adapted to be installed in a wall and a connector tube that is designed to engage and disengage the gas outlet device. More particularly, our invention pertains to a gas outlet device and a connector tube that can be engaged and disengaged by simply pushing and pulling the connector tube and which eliminates the necessity for rotating the connector tube in order to engage it with the gas outlet device.

1 Claim, 16 Drawing Figures

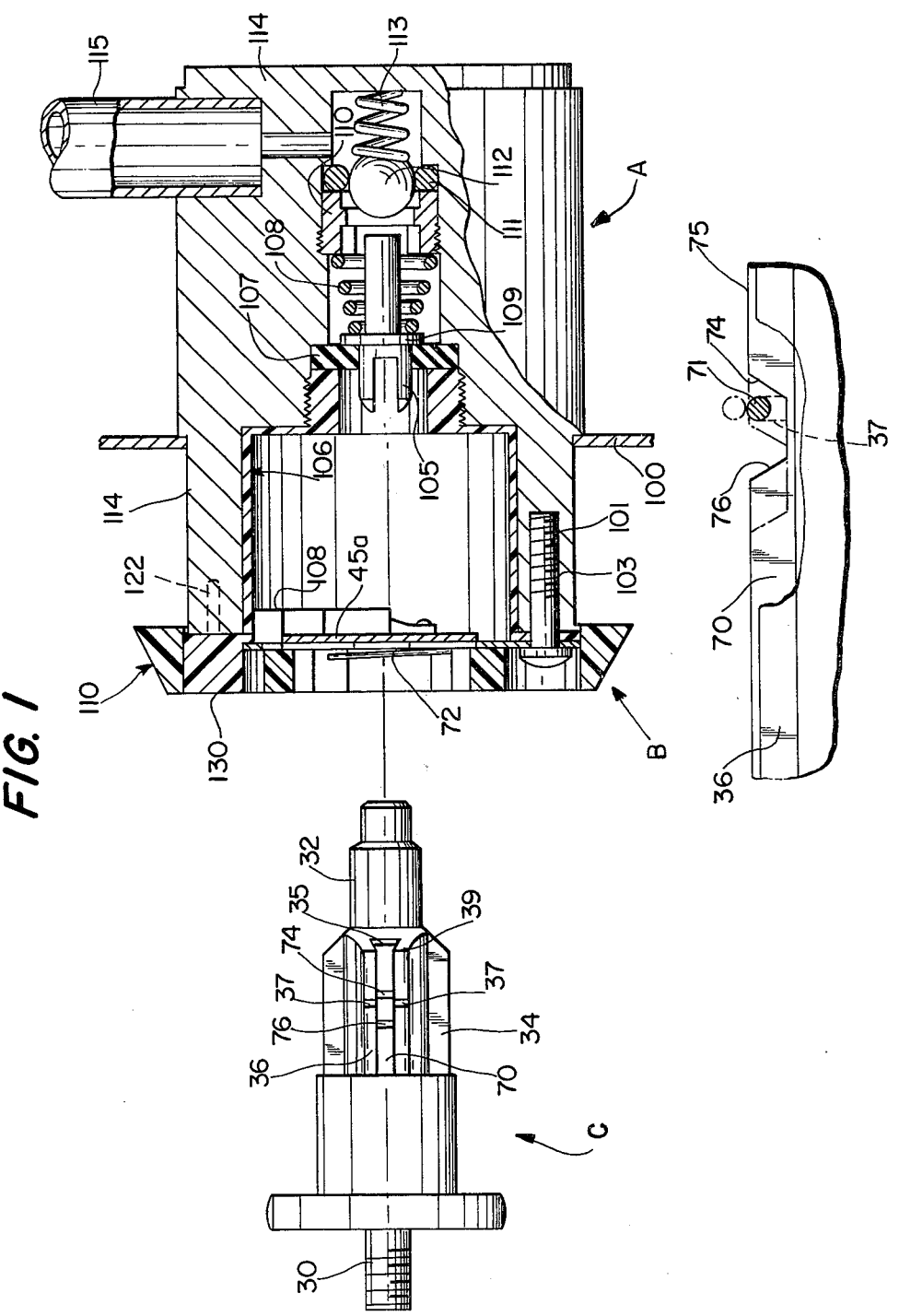

GAS SERVICE UNIT

BACKGROUND

A number of devices are known for connecting gas from a supply area to the place where the gas to to be utilized. One example of this is the device installed in the walls of hospitals to deliver gases such as oxygen and nitrogen from tanks outside of the hospital to equipment in the rooms of a hospital. U.S. Pat. Nos. 2,742,052; 3,563,267 and 3,931,829 discolse devices of this sort. The connector tube or adapter used with these wall units has usually required some sort of rotation in order to effect engagement.

THE PRESENT INVENTION

Our invention involves both a wall gas outlet of new construction and a connector tube of new construction. Our connector tube does not have to be twisted or rotated in order to effect engagement with the wall gas outlet, thus minimizing the possibility of defective engagement because of improper or insufficient rotation. However, our new wall gas outlet can accommodate both our new connector tube and most of the connector tubes heretofore in use.

THE DRAWINGS

Our invention will hereinafter be described with reference to the drawings wherein:

FIG. 1, is a side view, partly in section, of a housing, inlet section, and connector tube in accordance with our invention;

FIG. 4 is a fragmentary side view showing the engagement arrangement of the connector tube;

THE INVENTION IN DETAIL

Figure 6:
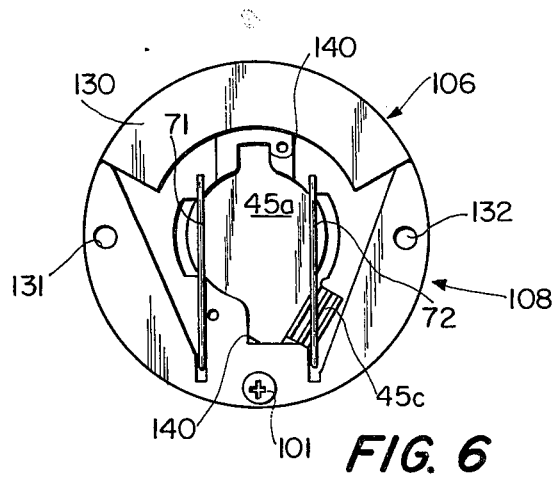
FIG. 6 is a front view of a portion of our inlet section.
Figure 9:
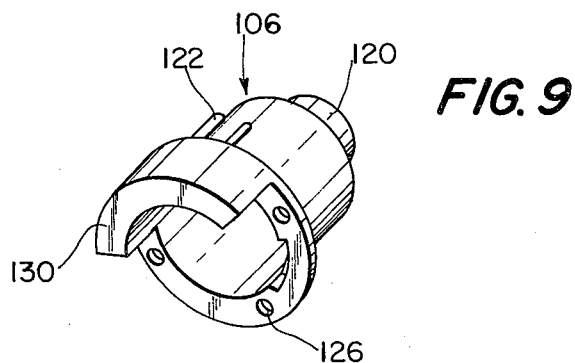
FIG. 9 is an isometric view of another portion of our inlet section.

FIG. 1 shows a unit that generally comprises a valve housing A, an inlet section B and a connector tube C. The housing A and inlet section B have many features that are similar to those shown in U.S. Pat. No. 3,931,829 and the disclosure of this patent is therefore incorporated herein by reference. More particularly, valve housing A mainly consists of a generally cylindrical metallic body 114 that has one end provided with an oxygen supply pipe 115 (e.g. by welding). The intermediate portion of the body 114 houses valves 109 and 112 that are normally biased to the closed position by springs 108 and 113. Valves 109 and 112 are designed to work in sequence and are seated against washer 107 and "O" ring 111 respectively, which are in turn maintained in the desired position by seat retainer section 106 and "O" ring retainer bushing 110. The inlet section B is composed of a member 106, member 108 and member 110. Member 106 is preferably made of plastic and, as is shown in FIGS. 1 and 9, does not have a constant diameter. The right end portion 120 holds the washer 107 in place. Pins 122 are designed to fit into holes in the end of body 114 and thus lock member 106 in place so that relative rotation is not possible. It should be noted that these pins are in different relative locations for different gases and are used to provide noninterchangeability. Member 108 is designed to fit against member 106, as is shown in FIGS. 1 and 6, and both members 106 and 108 are fastened to the body 114 by means of a bolt or screw 101 that passes through holes 124 and 126 of members 106 and 108 and hole 103 in body 114. Member 110 fits around the protruding portion 130 of member 106 and against member 108 and is secured in place by bolts or screws that pass through holes 134 of member 110, through holes 131 and 132 of member 108 and into aligned holes in body 114.

Figure 7:
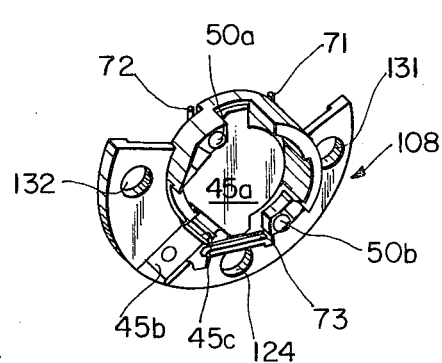
FIG. 7 is a back view of a part of our inlet section.

Member 108 has some features that are the same as those shown in U.S. Pat. No. 3,931,829 and some features that are different. A similar feature is that it has a one-piece spring biased door member 45a, 45b, 45c (compare FIGS. 2 and 4 of U.S. Pat. No. 3,931,829 and FIGS. 1, 6 and 7 of the present application). Another similar feature is that the backside of member 108 has hemispherical cam surfaces 50a and 50b (see FIG. 7) that are substantially the same as those shown in FIGS. 2, 3A and 3B of U.S. Pat. No. 3,931,829. These hemispherical surfaces will permit our device to be used with what can be designated as the "old style" connector tubes and which have pins such as the pins shown in FIGS. 3A and 3B of U.S. Pat. No. 3,931,829. In this connection members 108 and 110 are shaped at 140 and 142 to accomodate the insertion of an "old style" connector that has radially extending pins that are diametrically opposed to each other.

Figure 5:
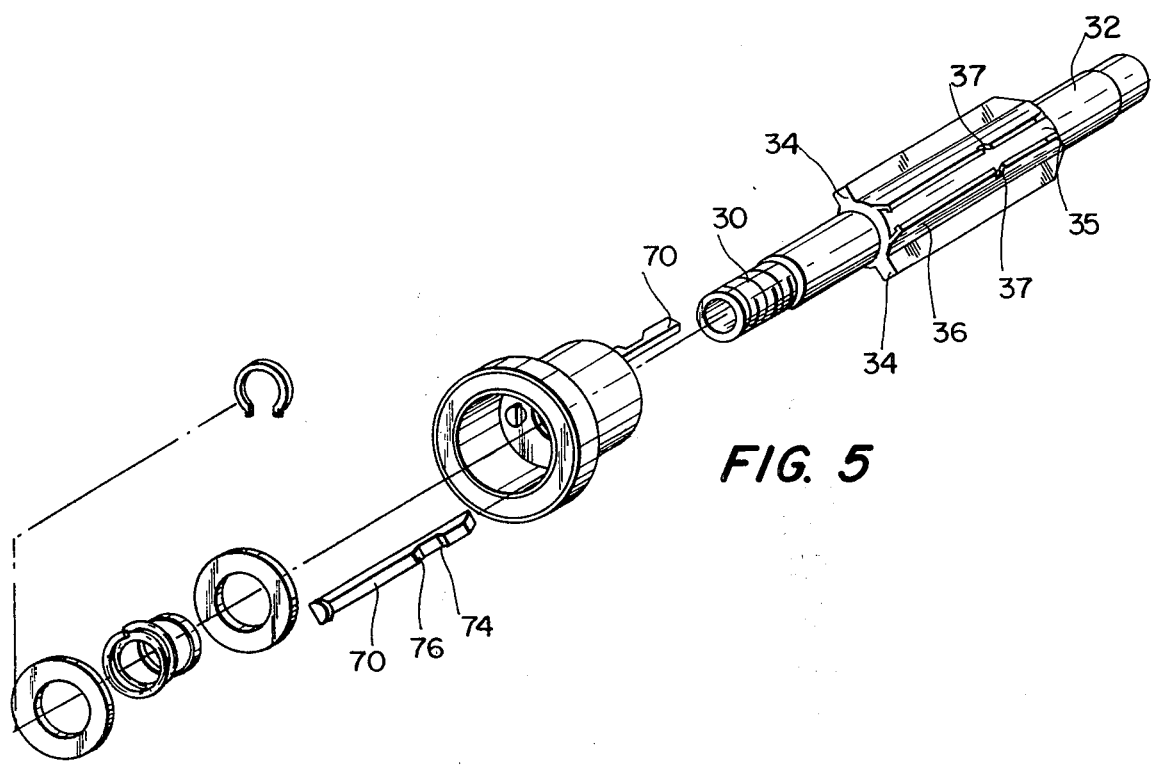
FIG. 5 is an exploded view of the connector tube.

Our device is different from that shown in U.S. Pat. No. 3,931,829 in that it is constructed so that it can also receive and hold a connector tube that is different from the ones heretofore known and used. More particularly, our device is adapted to receive and hold a connector tube which is constructed according to the present drawings, and which engages by pushing or pulling rather than by rotating. Referring to FIGS. 4 and 5, it will be seen that connector tube C is generally composed of a shaft that has an outer end portion 30 that may be threaded and an inner end portion 32 that is adapted to pass through members 110, 108 and 106 until the tip of end portion 32 has pressed against the right end 105 of valve 109 and moved it to the right, which in turn moves valve 112 to the right, thus permitting gas to flow from gas inlet pipe 115 through the housing A, and then out through the interior of connector tube C to whatever unit has been attached to the outer end portion 30 of the connector tube.

Figure 2:
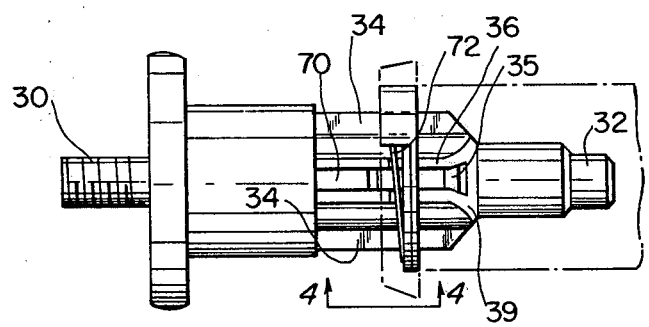
FIG. 2 is a view showing how the connector tube engages the inlet section.
Figure 3:
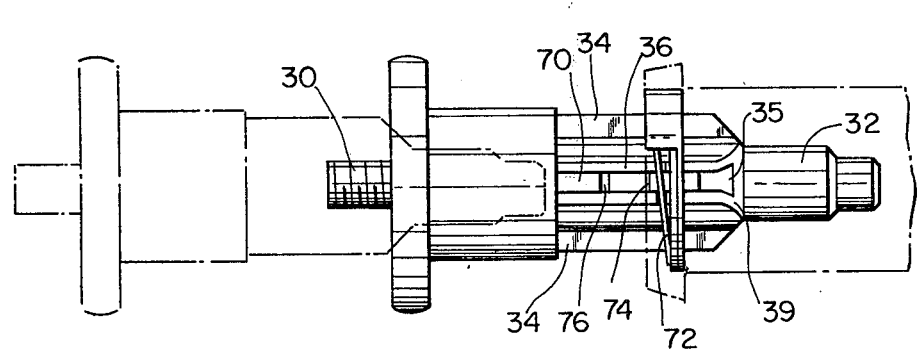
FIG. 3 shows how the connector tube disengages from the inlet section.
Figure 10:
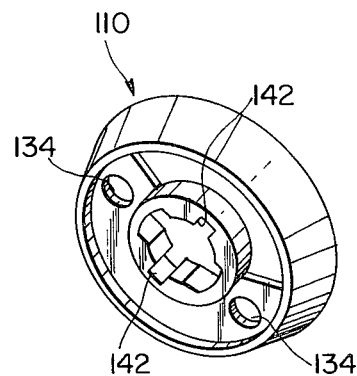
FIG. 10 is an isometric view of another portion of our inlet section.

The portion of the shaft intermediate the ends 30 and 32 is provided with radially extending ridges. In the embodiment shown in the drawings the shaft is provided with two diametrically opposed and radially extending ridges 34 that extend longitudinally along a substantial portion of the shaft. When the connector tube C is moved from the position shown in FIG. 1 to an "inserted" position as shown in FIG. 2, the ridges 34 first pass through U-shaped slots 142 of member 110 (see FIG. 10) and then through the U-shaped slots of member 108 (see FIG. 6), such U-shaped slots serving to both guide the ridges 34 and to prevent rotational movement of the connector tube.

It will also be noted that the connector tube C has two other elongated ridges 36 that are spaced 90° from ridges 34. Ridges 36 differ from ridges 34 in that ridges 36 contain a shallow longitudinal groove 35 which diverges in a downward direction. At one point along the ridge 35 and longitudinal groove 35 a transverse groove 37 is provided, which is disposed at right angles to longitudinal groove 35. If the shaft thus far described would be inserted into the inlet section B, the ridges 34 would pass through U-shaped slots 142 and 140, as previously described. However, ridges 36, which are 90° from ridges 34, would encounter locking wires 71 and 72 (see FIG. 6). Wires 71 and 72 are not connected to anything at their upper ends but are fastened to member 108 at their lower ends by wire 73. These wires are normally spaced aprt (see FIG. 6) a distance which is slightly less than the distance between the diametrically opposed top surfaces of ridges 36. Thus, when the shaft of the connector tube C is pushed into the inlet section B, wires 71 and 72 will first of all be pushed apart as they ride up the front inclined surfaces 39 of ridges 36, and remain in a diverged condition as they move along the top surface of ridges 36 until the transverse slot 37 is encountered. At this point the wires 71 and 72, which are resiliently biased toward the position shown in FIG. 6, but which have been pushed apart by the ridges 36, will snap down into the transverse slot 37 so that the shaft of the connector tube is locked against further inward longitudinal movement. Such locking in place is desirable during the time that gas is being used for equipment that is attached to end 30 of the shaft.

When further gas flow is not desired the connector tube C must be removed from the inlet section B. This first of all requires that the locking wires 71 and 72 be disengaged from the slots 37. Such disengagement can be accomplished in a number of different ways. The way that we have found to be quite simple involves placing a disengager arrangement on the shaft adjacent the outer end portion. The heart of this disengager mechanism is a disengager member 70 that is adapted to slide back and forth within groove 35. It has a base that is wider than its top so that it will remain in slot 35. The top surface 75 of the disengager member 70 is preferably either level with the top surface of ridge 36 or even slightly higher (as shown in FIG. 4), but member 70 does contain one cut-out section therein defined by inclined surfaces 74 and 76 (see FIGS. 1, 4 and 5). FIGS. 2 and 4 show the locking wire 71 locked in slot 37 and also in the aforesaid cut-out section of member 70. Locking wire 71 can be raised out of the slot 37 by moving member 70 longitudinally in slot 35. More specifically, if member 70 is moved outwardly (i.e. to the left in FIGS. 3 and 4) the inclined surface 74 will cause the wires 71 and 72 to be lifted upwardly and out of the slots 37, so that these wires will be raised to the phantom position shown in FIG. 4. Then, as the connector tube is pulled outward (i.e. to the left in FIG. 4) the wires will ride over to top surface of ridge 36, down inclined portion 39 and back to their original position (as shown in FIG. 6).

Figure 8:
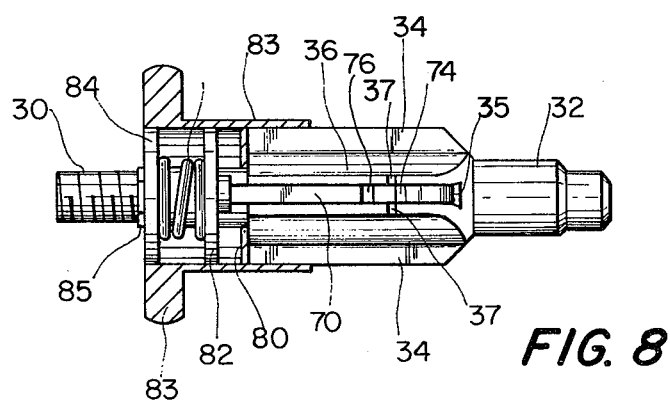
FIG. 8 is a partial sectional view of the connector tube shown in FIGS. 2 and 3.
Figures 11, 12, 13:
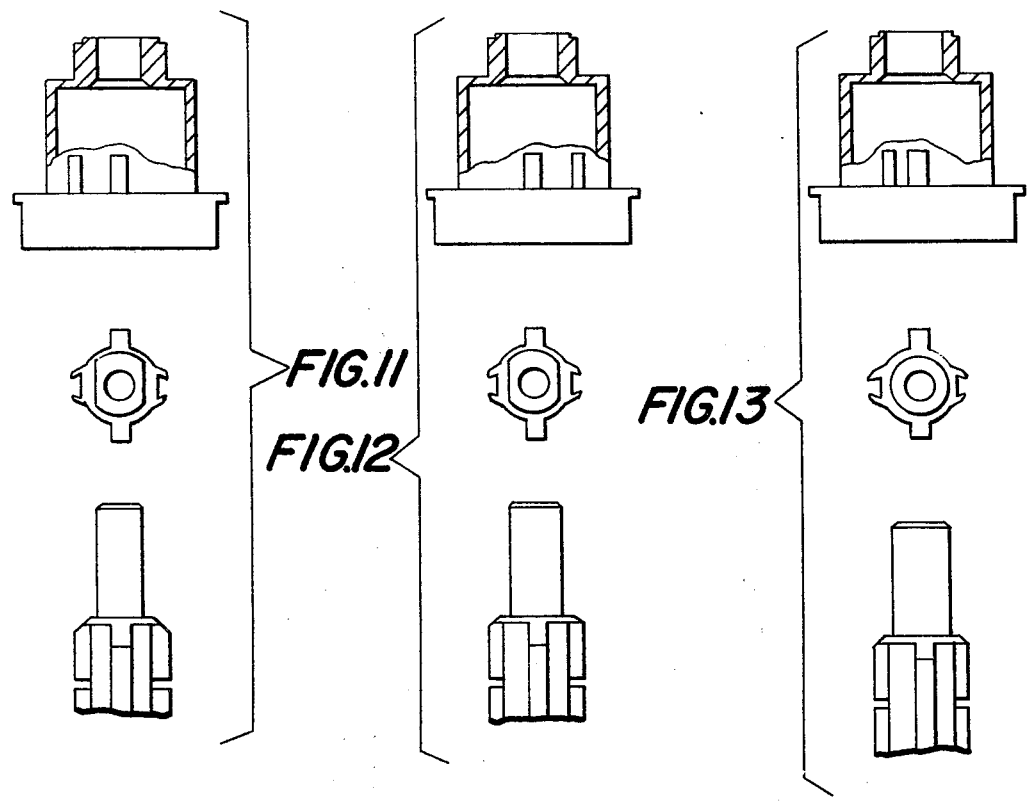
FIGS. 11 through 16 are fragmentary views of possible alternative constructions in accordance with this invention.
Figures 14, 15, 16:
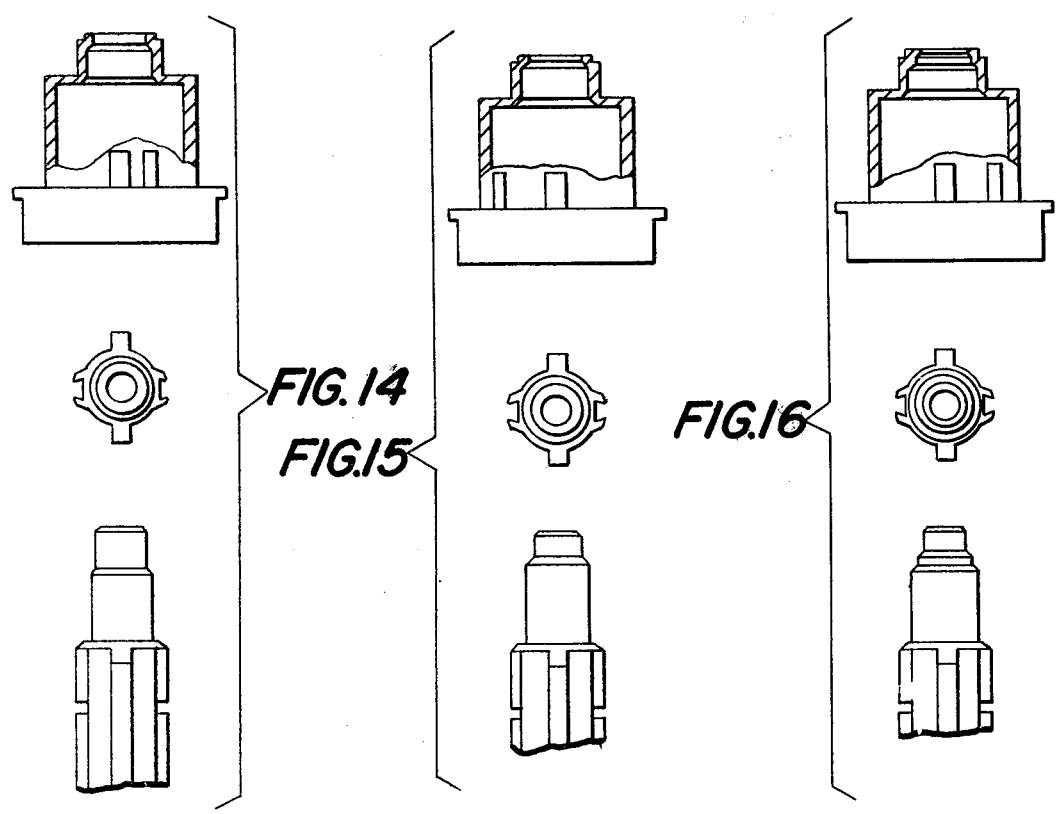

Disengager member 70 can be caused to move back and forth within slot 35 by securing its outer (left) end (as is shown in FIG. 8) between end plate 80 and spring plate 82 (member 70 preferably passes through a circular hole in end plate 80). End plate 80 is a fixed part of sliding cylindrical member 82 and will move to the left when pull member 83 is moved to the left. Spring retainer plate 84 is secured against movement to the left by lock washer 85 and will not move to the right because of spring 86, which is always urging plates 82 and 85 apart. Thus, when the connector tube C is locked into the inlet section because of wires 71 and 72 engaging slots 37, the connector tube may be disengaged by simply pulling pull member 83 to the left with manual pressure, since such a pull moves disengager member 70 to the left and inclined surface 74 will lift the wires 71 and 72 out of the slots as explained above.

It is thus seen that our new construction provides a very simple and reliable means for connecting and disconnecting gas sources to the gas using equipment.

FIGS. 11–16 show six alternative possibilities for some of the components previously described. In each of these figures the upper item corresponds to member 106 of FIG. 1, the middle item is an end view of the shaft of a connector tube and the bottom item is a partial side view of the inner end of a shaft of a connector tube. It is contemplated that when a valve housing A and an inlet section B are initially installed, for instance in the wall of a hospital, the choice of the socket member (e.g. member 106) that is chosen to be placed in the inlet section will determine what sort of connector tube can be used. This will insure that equipment requiring one gas will not be inserted into a valve housing that is supplying a different gas.

In conclusion, while the foregoing specification and drawing describe the construction, operation and use of one preferred embodiment of the instant invention, it is to be understood that we do not intend to limit ourselves to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claims. For instance, no invention would be involved in having only one ridge on the shaft instead of a plurality of such projections, or more than the ridges shown.

We claim:

1. In the known gas outlet device comprising in combination
    (a) a valve housing,
    (b) an inlet section to said valve housing, said inlet section having an opening, and
    (c) a connector tube that has one end that is adapted to be inserted through said openings and interengaged with said inlet section so as to cause the flow of gas through said valve housing, said inlet section and said connector tube,
  the improvement which comprises
    (1) the perimeter of said opening containing diametrically opposed slots,
    (2) two diametrically opposed elongated ridges extending along the exterior surface of said connector tube, said elongated ridges being adapted to pass through said slots in said inlet section,
    (3) a pair of spaced apart and parallel locking wires extending across the opening of said inlet section,
    (4) two spaced apart wire engaging members located on the exterior of said connector tube, each of said wire engaging members including a first portion that is adapted to spread said locking wires outwardly with respect to each other and a second transverse slot portion that allows the locking wires to return to an approximately parallel relationship, and (5) a disengager member associated with said connector tube which will when activated by pulling said connector tube, dislodge said locking wires from said transverse slot portion, whereby by pushing said connector tube into said inlet section said locking wires will engage with said transverse slot portions to thereby hold the connector tube and inlet section together and by pulling said connector tube away from said inlet section said disengager member will dislodge said locking wires from said transverse slot portion.

* * * * *